United States Patent [19]
Golser et al.

[11] 4,081,762
[45] Mar. 28, 1978

[54] GAS LASER WITH A LASER CAPILLARY POSITIONED IN A DISCHARGE TUBE

[75] Inventors: Hans Golser, Munich; Helmut Kindl, Westerham, both of Germany

[73] Assignee: Siemens Aktiengesellschaft, Berlin & Munich, Germany

[21] Appl. No.: 632,014

[22] Filed: Nov. 14, 1975

[30] Foreign Application Priority Data

Feb. 18, 1975  Germany ............................ 2506842
Feb. 18, 1975  Germany ......................... 754887[U]
Feb. 18, 1975  Germany ............................ 2506707

[51] Int. Cl.² ............................................. H01S 3/00
[52] U.S. Cl. ..................... 331/94.5 G; 331/94.5 D; 331/94.5 PE; 331/94.5 C
[58] Field of Search ......... 331/94.5, 94.5 G, 94.5 PE, 331/94.5 C, 94.5 D; 330/4.3; 313/283

[56] References Cited

U.S. PATENT DOCUMENTS

| | | | |
|---|---|---|---|
| 3,543,182 | 11/1970 | Witteman et al. | 331/94.5 G |
| 3,775,700 | 11/1973 | Garman et al. | 331/94.5 G |
| 3,784,927 | 1/1974 | Rudolph | 331/94.5 D |
| 3,798,567 | 3/1974 | Dewaurechin | 331/94.5 D |
| 3,851,275 | 11/1974 | Furuse et al. | 331/94.5 D |
| 3,904,986 | 9/1975 | Hernquist | 331/94.5 G |
| 3,916,337 | 10/1975 | Kindl | 331/94.5 D |

OTHER PUBLICATIONS

Wright et al., Electronics, vol. 47, Jun. 13, 1974, pp. 91-95.

*Primary Examiner*—Martin H. Edlow
*Attorney, Agent, or Firm*—Hill, Gross, Simpson, Van Santen, Steadman, Chiara & Simpson

[57] ABSTRACT

A gas laser having a vacuum-tight discharge tube characterized by the discharge tube consisting of a glass cylinder whose two ends are closed by metal caps. Each of the metal caps support a mirror member which is connected to a transition member by a glass solder connection. A laser capillary which is made of glass has one end fused to the glass cylinder and has its other end supported by a spring which consists of a material which has a high heat resistance and may be hardened after assembly with the laser capillary and discharge tube. The laser capillary has a portion surrounded by a cold cathode which is disposed in the interior of the discharge tube and consists of a rolled sheet of resilient metal which tightly engages the inner surface of the discharge tube due to its own resilient spring force.

5 Claims, 3 Drawing Figures

U.S. Patent  March 28, 1978  4,081,762
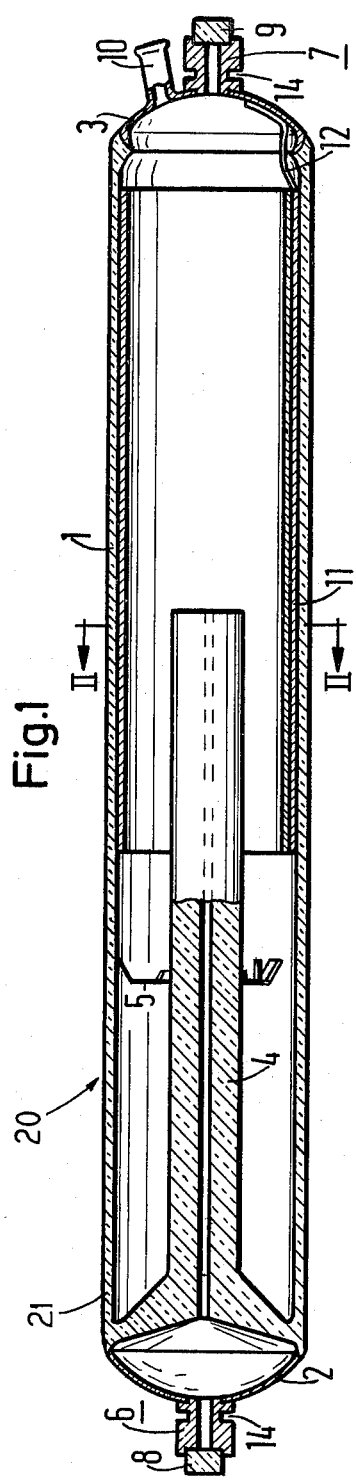
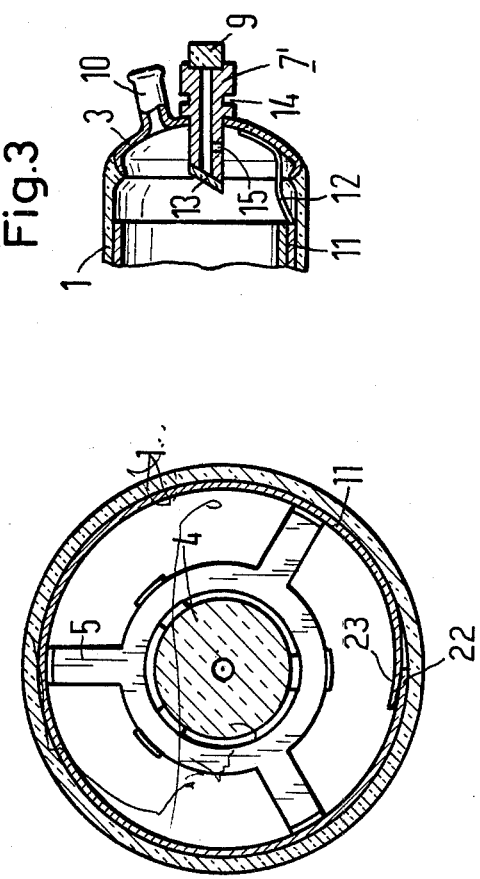

GAS LASER WITH A LASER CAPILLARY POSITIONED IN A DISCHARGE TUBE

BACKGROUND OF THE INVENTION

1. Field of the Invention

The present invention relates to a gas laser having a vacuum-tight discharge tube, a laser capillary having at least a part of its length positioned in the interior of the discharge tube and in communication therewith. The gas laser includes an anode and a cathode disposed in the discharge tube and means for producing electrical discharge therebetween and in the laser capillary. The gas laser further includes two mirrors mounted on the discharge tube to form an optical resonator.

2. Prior Art

Gas lasers having a vacuum-tight discharge tube, a laser capillary with at least a portion of the capillary extending into the discharge tube and in communication therewith, having an anode and a cathode disposed in the tube with means for producing an electrical discharge therebetween and in the laser capillary and including two mirrors forming an optical resonator are known. In these known gas lasers, a discharge tube may have at least a portion consisting of a cylindrical tube of glass which has at least one of the ends closed off by a metallic plate which is provided with an opening behind which a mirror member is positioned on the outside of the discharge tube. For example, see *Laser + Elektro-Optik*, No. 4, 1974, page 64. In the case of this gas laser, which can be produced fully automatically and in relatively few production steps, the mirror members are directly fixed to the plates with a so-called "hard-seal" seal joint or sealing compound. It is true that such a sealing material has better sealing properties than the epoxy resin glues which are otherwise commonly used and particularly it appears to prevent diffusion of moisture into the discharge tube or tube enclosure; however, it does not provide the superior qualities of a permanently hermetically sealed glass solder closing.

Since it is not possible without difficulties to adapt the coefficient of thermal expansion of the mirror members, the closing plate and the glass tube to one another sufficiently and therefore the sealing must remain ductile, glass solder has not been considered for use in the tube construction of the just described prior art gas laser. When a metal part only serves as an end piece for a glass capillary, a much lesser critical geometry is given with respect to the thermal stresses, and for this reason the prior art has not tried to do more than solder the mirror member to such a metal part. For example, in U.S. Pat. No. 3,826,998, a mirror frame on which a mirror has been attached is used as an end section for a glass capillary. In the particular structure of this United States patent, the mirror frame includes a wall zone which has a weakened strength so that it may be permanently and plastically deformed by way of applying a tool from the outside of the capillary tube for purposes of adjusting the position of the mirror member.

In the prior art gas lasers, special electrical connections such as pins extending through the glass envelope are required. These pins in particular are for forming connections for the anode and cathode and cause an increase in the manufacturing cost and limit the use of automated assembly equipment.

With regard to the cathode, gas lasers usually use a cold cathode which is a seamless tube and which is held in a concentric spaced position within the tube forming the discharge tube. An example of such a structure is disclosed in U.S. Pat. No. 3,801,929. In the structure illustrated in this patent, the supports for mounting the seamless tube cathode in the discharge tube requires special production and mounting expenses. Furthermore, heat accumulation within the discharge tube may impair the life of the cathode and the structural stability of the discharge tube adjacent the cathode.

Instead of using a seam-free or seamless tube for the cathode, it has been suggested to use cathode tubes which are formed of a rolled sheet which has its edges folded into contact and into an interlocking joint. While such a cathode reduces some of the production costs, the problems with supporting the cathode and the heat dissipation problems still exist.

It has also been suggested to apply a layer or press a layer of aluminum onto an inner wall surface of the tube. While this construction improves the heat transport capabilities of the cathode and also decreases the non-active cathode surfaces which may release impurities into the atmosphere of the tube during operation, this type of structure increases the difficulty of construction during manufacturing.

If aluminum is used as the cathode material in a gas laser, normally a getter, such as zirconium-carbon getter, is inserted into the discharge tube in order to bind gases which are escaping from the surface of the aluminum cathode during operation of the laser. If zirconium were used as the cathode material instead of aluminum, a getter is not required; however, zirconium is a more expensive material. If the discharge tube is subjected to a baking-out process at a temperature of 400° C or above, after the assembly of the discharge tube has been completed, it has been suggested that aluminum can be used as the cathode without requiring the addition of a getter. However, the thermal stresses that are created by the baking-out temperature, may cause detrimental effects on the structure of the presently known discharge tube.

The mounting of the laser capillary within the interior of a discharge tube presents several problems. It has been suggested to rigidly mount the laser capillary with respect to the discharge tube at one position and to support the capillary elastically such as by a spring element at at least one other position. Such a construction is disclosed in the German Offenlegungsschrift No. 2,129,142 dated Dec. 28, 1972. A support of a capillary tube using an elastic support for at least one position and a fixed or rigid support at a second position represents a compromise between a rigid two point securing or mounting of the capillary within the discharge tube and a single rigid mounting either at one end or at the center of the tube.

If the laser capillary is fused with the discharge tube at two positions, a mechanically rugged arrangement will be obtained. However, during the operation of the tube, stresses caused by the increased temperature may cause warping or bowing of the capillary and corresponding directional fluctuations which create intensity losses in the output radiation of the gas laser. While this problem of stresses caused by an unbalanced thermal expansion during operation does not occur with the single fixed mounting, such as by fusing of the capillary to a portion of the discharge tube, the single fixed or rigid mounting of the capillary is very sensitive to shaking or vibration and thus is easily damaged while transporting the gas laser or while using the gas laser in an operation where it is subjected to vibrations.

The above-mentioned compromise of using an elastic mounting provided by a spring element along with a fixed or rigid mounting has experienced certaib difficulties. For example, the spring element must hold the capillary in a center position within the discharge tube with as little radial play as possible but at the same time with sufficient elasticity. Since the transverse dimensions of the capillary such as a glass tube and of the discharge tube usually vary, the previously used spring element usually had a relatively long spring path and a correspondingly weak spring force. Another suggested construction was to have the capillary extend into a counterbore in a massive metal end member of the discharge tube and the capillary was mounted in the bore by a slightly elastic cuff or bushing. Another problem with the spring elements is that spring elements made of steel have a decreased elasticity when heated to temperatures of several hundred degrees celsius (centigrade) such as 400° C. Such a temperature is required for baking-out the assembled discharge tube in order to obtain a long life expectancy of the gas laser.

SUMMARY OF THE INVENTION

The present invention is directed to improvements in a structure of a gas laser which improvements simplified the construction of the gas laser, produce a more robust structure, assure a long life expectancy for the laser and enable manufacturing the laser with automated processes.

To accomplish these tasks, the present invention involves improvements in a gas laser having a vacuum-tight discharge tube, a laser capillary having at least a part of its length positioned in the interior of the discharge tube and in communication therewith, said laser having an anode, a cathode and means for producing an electrical discharge therebetween and in the laser capillary, and said laser having two mirror members forming an optical resonator. One of the improvements is that the discharge tube or envelope has a cylindrical tube consisting of glass and has at least one metal plate for closing an end of the cylindrical tube of the glass. The metal plate has an opening with a metal tubular transition member being secured therein by a solder connection. One of the mirror members is positioned outside of the discharge tube and connected to the tubular transition member in line with the opening in the metal plate by a glass brazed connection so that the coefficients of thermal expansion of the tube of glass and the metal plate as well as the coefficient of thermal expansion of the tubular transition member, the glass solder and the mirror member are at least approximately equally large. The transition member preferably has a wall zone of weakened strength so that the member can be permanently and plastically deformed by the application of a tool from outside the discharge tube to enable aligning the mirror member connected thereto. The metal plate and its transition member may serve as one of the discharge electrodes such as the anode or may be a part of the electrical connection for a discharge electrode such as a cathode. The transition member may extend through an opening of the metal plate and into the interior of the discharge tube to support a transparent disc at an acute angle with an axis of the discharge tube which angle is preferably the Brewster angle.

Another area of the improvement is that the cathode is formed by a rolled sheet of resilient metal disposed in the interior of the cylindrical tube portion of the discharge tube and surrounding a portion of the laser capillary. The rolled sheet is held against the interior surface of the cylindrical tube portion by its own resilient spring force. Preferably, the width of the sheet is greater than the inner circumference of the cylindrical tube portion so that the marginal edge zones overlap and extend along a line parallel to the axis of the cylindrical tube portion as the rolled sheet engages an inner surface thereof. The sheet may be of aluminum and is electrically connected by a feed line to one of the metal end plates which forms a connection for applying a current to the cathode.

Another area of improvement is that the laser capillary is rigidly supported at one position within the discharge tube and is elastically supported at least at one further position by a metal spring which is of a heat resistant material which is hardenable at elevated temperatures so that the metal is ductile when it is assembled with the laser capillary and the discharge tube and then subjected to a hardening step after completion of the assembly.

The above improvements in the structure of the gas laser enable utilizing a gas solder for attaching a mirror to a transition member and mantaning the advantages which are achieved by using a metal plate for closing an end of the discharge tube. For example, the metal intermediate member will provide a permanent vacuum-tight and a less thermally stressed connection with the glass mirror member and the intermediate member which is brazed to the metal cap or plate utilizes an uncritical metal brazed connection which allows deviations between the plate and member with respect to heat expansion behaviors. In addition, the structure enables a larger possible selection for the types of glass solder, and materials for the mirror members.

In an embodiment of the invention in which both ends of the glass cylindrical tube are closed by the metal cap or plate which supports an intermediate member which in turn supports a mirror member, the metal intermediate member and the metal plate provide connections for the cathode and anode, respectively and thus reduces the number of individual parts necessary and eliminates the need of electrical connections extending through the envelope such as the glass tube.

The improvement of using a rolled sheet of resilient metal such as aluminum as the cathode provides the advantage of a simple mounting of the tubular cathode within the tube which mounting eliminates the need for either a number of spacers or pins that were fused in the glass envelopes or tubes for engaging and positioning the cathode within the discharge tube. Due to the self-clamping effect of the resilient metal forming the cathode, the laser can be operated in any position. The cathode has a large surface contact with the wall of the discharge tube and therefore can be maintained at favorable temperatures during operation which temperatures are uniform throughout the cathode and are applied in an even distribution to the wall of the discharge tube. Finally, the tolerance with regard to the dimensions of the width of the sheet which is rolled to form the cathode are large and the overlapping edge zones or margins insure an active emission surface which is evenly distributed over the entire circumference of the discharge tube. The construction of the gas laser using the improved cathode structure drastically reduces manufacturing cost and enables the development of a "cheap laser".

The improvement involving using a metal spring of material which is resistant to high temperatures and can be hardened after it is assembled with the capillary and the discharge tube provides the advantage of assembling the spring while still in a soft or ductile state which state enables easy assembly and forming the spring to compensate for variations in the dimensions of the discharge tube and capillary. The subsequent step of hardening the spring is preferably accomplished during a vacuum baking-out process which would be carried out after the complete assembly of the discharge tube so that the laser is provided with a long life expectancy. Thus, a simple capillary mounting is obtained which is able to comply with the requirements for mass production of a cheap laser. It should be noted that the particular improvements with regard to the metal plates, the transition members and mirrors withstanding thermal stresses enable using a rolled sheet of aluminum as the cathode without the requirement of a getter material. Thus, the improved structure of the envelope of the discharge tube, which withstands thermal stresses, enables the baking-out of the assembled discharge tube at a high baking-out temperature of above 400° C.

BRIEF DESCRIPTION OF THE DRAWINGS

FIG. 1 is a longitudinal cross section with portions in elevation for purposes of illustration of a gas laser tube in accordance with the present invention;

FIG. 2 is a cross section taken along lines II—II of FIG. 1; and

FIG. 3 is a partial cross section illustrating a structural embodiment of the present invention.

DESCRIPTION OF THE PREFERRED EMBODIMENTS

The principles of the present invention are particularly useful when incorporated in an illustrative example of a gas laser generally indicated at 20 in FIG. 1. The gas laser 20 is preferably a He-Ne laser and has a discharge tube or envelope 21.

The discharge tube 21 consists of a smooth cylindrical tube 1 of glass, which is vacuum-tightly closed at one end by a metal cap or plate 2 which has a fused connection therewith. The other or front end of the cylindrical tube 1 is closed by a metal cap or plate 3 which is also attached to the glass tube 1 by a fused connection. A glass capillary 4 having a funnel-shaped end is mounted within the tube 1 with the funnel portion being fused to the glass tube 1 adjacent the cap 2. The glass capillary 4 is provided with at least one elastic support at another position which support is a metal spring 5.

Each of the metal caps or plates 2 and 3 has a center opening. The center opening of the cap 2 receives a transition member 6 and the center opening of the metal cap or plate 3 receives a transition member 7. Both of the transition members 6 and 7 are hollow or tubular metal members and are joined with their respective caps 2 and 3 by a solder connection such as a metal brazing connection. The transition members 6 and 7 form mirror frames for carrying mirror members 8 and 9, respectively. The mirror members 8 and 9 are hermetically and tightly connected to their respective mirror frame or transition member by a glass solder connection.

The wall of each of the frame members or tubular transition members is weakened in a wall zone 14 to enable plastic, permanent deformation of the member 6 or 7 by applying a tool which is applied external of the envelope of the discharge tube 21 and enables adjusting the alignment of either one of the respective mirror members 8 and 9. It is noted that the weakened wall zone of the transition member such as 6 or 7 can be of any structure such as the structural embodiments which are disclosed in the above-identified U.S. Pat. No. 3,826,998.

The metal plate or cap 3 which is the front end of the laser has a metallic exhaust tube or vent 10 which is located adjacent to the mirror frame 7. As illustrated the vent 10 is integrally formed in the cap 3 at a position which does not interfere with the laser beam created in the gas laser 20.

In the laser 20, the metal cap 2 and its transition member 6 serve as an anode for the gas discharge occurring in the interior of the discharge tube. A rolled aluminum sheet is provided as the cathode 11 which is a so-called cold cathode. The cathode 11 rests against the inside surface of the glass tube 1 and is held in this engagement with the surface by its own spring force. To compensate for any variations in the inner circumference of the glass tube 1, the sheet forming the cathode 11 will have a width greater than the inner circumference of the tube 1 so that as the rolled sheet is inserted in the tube 11, marginal edges or zones 22 and 23 of the sheet will be overlapping (FIG. 2) and the overlapped edges extend on a line parallel to the axis of the tube 1. In addition to compensating for tolerances in the circumference of the tube 1, the overlapping of the edges 22 and 23 guarantees that the active emission surface of the cathode 11 is evenly distributed over the entire inner circumference of the tube 1.

As illustrated, the hollow cathode 11 partially surrounds an end of the capillary 4 and is connected by a feed line 12 to the metal cap 3. Thus, the cap or plate 3 along with the transition member 7 provides an electrical connection for the cathode.

The metal caps or plates 2 and 3 are selected of a material whose coefficient of thermal expansion corresponds to the coefficient of expansion for the glass tube 1. Thus, if the glass cylindrical tube 1 is selected as a hard glass with a coefficient of thermal expansion $a = 50 \cdot 10^{-7}/° C$ or is selected as a lead glass, the metal pieces 2 and 3 will be selected of a Ni-Co base alloy. On the other hand, the coefficient of thermal expansion for the transition members or frames 6 and 7, the mirror members 8 and 9 and the glass solder, which is used to form the glass solder connection, will be selected to have almost an equal value for the coefficient of expansion. If for instance, Crown glass (Crown glass I) with a coefficient of thermal expansion $a = 96 \cdot 10^{-7}/° C$ is used, a suited alloy for the transition members or mirror frames 6 and 7 is a Ni-Cr alloy. If a Crown glass (Crown glass II) which is permeated or saturated with zinc and has a coefficient of thermal expansion $a = 50 \cdot 10^{-7}/° C$ is used for the mirror members 8 and 9, the transition members 6 and 7 are formed of a Ni-Co alloy. In the case of the use of Crown glass II, lead borate glass is selected as the glass solder. A combination of hard glass for the glass tube 1 and mirror members made of Crown glass I as well as a lead glass for the tube I and mirror members made of Crown glass II has proven particularly favorable. Of course, other combinations of material can be used besides the above-mentioned one.

In a similar manner, other sheets of resilient metal besides aluminum may be used for the cathode 11. For example other elastic or resilient materials such as chromium, titanium or zirconium may be used for the rolled sheet cathode 11.

The metal spring 5 is selected of a heat resistant material which is ductile or soft during assembly in the envelope of the laser and is subsequently hardened. A particularly suitable alloy for the metal spring 5 is a Co-Ni-Cr base alloy. A particularly useful composition is 40% Co, 26% Ni, 12% Cr, 0.2% Be with the remainder being Fe. A spring made of such an alloy may be easily mounted and formed to adapt to the dimensions of the particular individual pieces of the gas laser so that an elastic clamping of the capillary which clamping has little radial play and free longitudinal play can be obtained. The spring element 5 is then hardened during the vacuum baking-out process which will be accomplished at a temperature of approximately 500° C. These temperatures will eliminate possible stresses in the glass members. For the subsequent baking-out with a fixed mirror member, high temperatures may also be selected in the case of the heat resistant glass solder connection and, thus, the cathode and walls of the envelope are effectively de-gased. Such a treatment gives an extremely long life expectancy for the gas laser.

The entire tube with its coaxial construction does not contain any fused-in contact pins and thus can be produced automatically. In addition, the discharge tube will have the mirror members attached to their frame members by a glass solder connection, but still have the advantages obtained with a metal plate for closing the ends of the glass tube 1. As noted above, the mechanically rugged structure of the gas laser 20 enables easy manipulation during use thereof and requires comparatively few individual parts. Due to its symmetrical construction, it may be produced very favorably with the help of automatic machines. Furthermore, the entire device is very handy and less sensitive to impacts or vibrations. Due to its rotation symmetric construction and the smooth outer wall of the glass tube 1, the tube 1 can be obtained using automatic machines.

Since the metal caps or plates 2 and 3 are fused on the glass tube 1 of the discharge tube, since the metal plates or caps and the intermediate members are brazed to one another preferably with a metal solder, and since the intermediate members are interconnected with the mirror members by a glass solder, the construction of the discharge tube is able to withstand temperatures of several hundred degrees celsius and permits the sufficiently high baking-out temperatures of between 400° and 500° C so that the cathode and the other internal surfaces will only admit a minor amount of gas during subsequent laser operation and thus the gas atmosphere of the discharge tube 21 is only slightly contaminated with time.

The following operational parameters may, for instance, be selected for the gas laser 20: Hè-Ne mixture 6 : 1 to 10 : 1; a filling pressure of 2 to 4 Torrs; an entire length of 15 to 30 cm; greatest diameter of the tube 2.5 to 3.5 cm; diameter of the capillary boring or passage approximately 1–2 mm; ignition voltage of 5–6 KV; anode voltage approximately 1 KV; anode current up to 6 mA; a bias resistance larger than approximately 60 K ohms; and an output power of approximately 1–2 mW.

A structural embodiment of the gas laser is illustrated in FIG. 3 and like parts are identified by the same element numbers. The major difference is that the transition member 7' extends through the central opening in the cap 3 and supports a plate 13 at an acute angle to the axis of the gas laser tube. This angle is preferably the Brewster angle and the transparent plate 13 is a so-called Brewster window. The window as known in the prior art causes the output radiation to be polarized in of the direction perpendicular to the plane ofthe Brewster angle. Thus, the Brewster window 13 will produce a linear polarization of the output of the gas laser. In the construction of FIG. 3, the transition member or mirror frame 7' is provided with a vent 15 which communicates the hollow passage of the member 7' with the interior of the discharge tube. Thus, a pressure balance between the discharge chamber and the interior of the frame is obtained. This balance permits the selection of a particularly thin thickness for the window 13 so that displacement of the beam is as small as possible. The use of a thin window 13 is possible due to the vacuum-tight closing of the interior of the member 7' and the discharge tube by the mirror member 9 whose glass solder connection is subjected to the atmospheric pressure outside of the discharge tube.

Although various minor modifications may be suggested by those versed in the art, it should be understood that we wish to employ within the scope of the patent granted hereon, all such modifications as reasonably and properly come within the scope of our contribution to the art.

We claim:

1. In a gas laser having a vacuum-tight discharge tube, a laser capillary having at least a part of its length positioned in the interior of the discharge tube and in communication therewith, said laser having an anode, a cathode and means for producing electrical discharge therebetween and in the laser capillary, and said laser having two mirror members forming an optical resonator, the improvement which comprises in combination:

(A) an envelope assembly consisting of
   (1) an elongated cylindrical tube consisting of a first glass and having an envelope axis,
   (2) two end caps, each one consisting of a first metal, each one disposed across a different end of said tube and sealingly fused thereto in regions of contact, and each one having an aperture defined therein about said envelope axis, one of said end caps having an exhaust tube means functionally associated therewith,
   (3) the coefficient of thermal expansion of said first glass being about equal to the coefficient of thermal expansion of said first metal,
(B) two mirror members, each one consisting of a second glass,
(C) two tubular members each one having a tube axis, and each one consisting of a second metal, and including first solder means sealingly engaging one end of each one of said tubular members to a different one of said end caps over said aperture thereof with said tubular members being so oriented spatially that their respective said tube axes are generally coaxial with each other and with said envelope axis, and second solder means sealingly engaging the opposite end of each one of said tubular members to a different one of said mirror members,
(D) the coefficient of thermal expansion of said second glass being about equal to the thermal coefficient of expansion of said second metal,
(E) an elongated glass capillary tube member having at one end thereof a funnel-shaped configuration which is fused to the inside of said tube adjacent one of said end caps, and having the other end thereof terminate beyond the middle of said tube, and including a support member, said support member being disposed radially between said capillary tube member and said tube and consisting of a heat hardinable metal spring alloy, and (F) an aluminum sheet member disposed adjacent the other one of said end caps circumferentially inside said tube and yieldingly biased adjacent the walls thereof, said sheet member having longitudinally extending overlapping marginal edge portions, and including electrical connector means joining said sheet member to said other end cap, said sheet member surrounding the terminal portion of said capillary tube.

2. In a gas laser having a vacuum-tight discharge tube, a laser capillary having at least a part of its length positioned in the interior of the discharge tube and in communication therewith, said laser having an anode, a cathode and means for producing electrical discharge therebetween and in the laser capillary, and said laser having two mirror members forming an optical resonator, the improvement which comprises in combination:

(A) an envelope assembly consisting of
  (1) an elongated cylindrical tube consisting of a first glass and having an envelope axis,
  (2) two end caps, each one consisting of a first metal, each one disposed across a different end of said tube and sealingly fused thereto in regions of contact, and each one having an aperture defined therein about said envelope axis, one of said end caps having an exhaust tube means functionally associated therewith,
  (3) the coefficient of thermal expansion of said first glass being about equal to the coefficient of thermal expansion of said first metal, (B) two mirror members, each one consisting of a second glass, (C) two tubular members each one having a tube axis, and each one consisting of a second metal, and including first solder means sealingly engaging one end of each one of said tubular members to a different one of said end caps over said aperture thereof with said tubular members being so oriented spatially that their respective said tube axes are generally coaxial with each other and with said envelope axis, and second solder means sealingly engaging the opposite end of each one of said tubular members to a different one of said mirror members, (D) the coefficient of thermal expansion of said second glass being about equal to the thermal coefficient of expansion of said second metal, (E) an elongated glass capillary tube member having at one end thereof a funnel-shaped configuration which is fused to the inside of said tube adjacent one of said end caps, and having the other end thereof terminate beyond the middle of said tube, and including a support member, said support member being disposed radially between said capillary tube member and said tube and consisting of a heat hardinable metal spring alloy, and (F) an aluminum sheet member disposed adjacent the other one of said end caps circumferentially inside said tube and yieldingly biased adjacent the walls thereof, said sheet member having longitudinally extending overlapping marginal edge portions, and including electrical connector means joining said sheet member to said other end cap, said sheet member surrounding the terminal portion of said capillary tube, and (G) the tubular member which is associated with said other one of said end caps extending through said aperture thereof into the interior of said envelope, and having a transparent plate disposed across the inner end of said tubular member at a Brewster angle, and mounting means for said plate, said tubular member including vent means through a side wall thereof located in the interior of said envelope.

3. The gas laser of claim 2 wherein said first glass has a coefficient of thermal expansion of about $50 \times 10^{-7}/°$ C., said first metal consists of a Ni-Co alloy, said second glass has a coefficient of thermal expansion of about $96 \times 10^{-7}/°$ C., and said second metal consists of a Ni-Cr alloy.

4. The gas laser of claim 2 wherein said support member consists of a Co-Ni-Cr alloy.

5. The gas laser of claim 2 wherein said support member consists of about 40% Co, 26% Ni, 12% Cr, 0.2% Be with Fe as the remainder up to 100 weight percent.

* * * * *